United States Patent

Wenker et al.

[11] Patent Number: 5,788,471
[45] Date of Patent: Aug. 4, 1998

[54] SPOOL VALVE WHEEL MOTOR

[75] Inventors: Wayne B. Wenker, Eden Prairie; Rand J. Erpelding, Golden Valley; Scott E. Yakimow, St. Paul, all of Minn.

[73] Assignee: Eaton Corporation, Cleveland, Ohio

[21] Appl. No.: 661,540

[22] Filed: Jun. 11, 1996

[51] Int. Cl.[6] .................................................... F01C 1/10
[52] U.S. Cl. ................................................... 418/61.3
[58] Field of Search .......................................... 418/61.3

[56] References Cited

U.S. PATENT DOCUMENTS

| Re. 25,291 | 12/1962 | Charlson | 418/61.3 |
|---|---|---|---|
| 3,087,436 | 4/1963 | Dettlof et al. | 418/61.3 |
| 3,554,675 | 1/1971 | Hansen | 418/61.3 |
| 3,606,598 | 9/1971 | Albers | 418/61.3 |
| 3,778,197 | 12/1973 | Takagi | 418/61.3 |
| 3,887,308 | 6/1975 | Liebert | 418/61.3 |
| 4,171,938 | 10/1979 | Pahl | 418/61.3 |
| 4,295,805 | 10/1981 | Liebert | 418/61.3 |

*Primary Examiner*—John J. Vrablik
*Attorney, Agent, or Firm*—L. J. Kasper

[57] ABSTRACT

A gerotor motor (11) of the type having a spool valve (51) which is formed integrally with the output shaft (49), wherein the spool valve includes forward (67) and rearward (69) journal surfaces. Disposed radially between the output shaft (49) and a bearing-receiving portion (71) of the motor housing (13) is a ball bearing set (73), which is preloaded during assembly such that the rated side load on the output shaft (49) will not cause any substantial radial movement of the shaft within the bearing set (73). In order to reduce the length, and cost of the motor (11), the conventional wear plate adjacent the gerotor gear set (15) has been eliminated, such that both the valve housing (13) and the spool valve (51) are disposed immediately adjacent the gerotor gear set, and the rotating spool valve (51) is in engagement with the orbiting and rotating star member (27).

8 Claims, 4 Drawing Sheets

5,788,471

1

SPOOL VALVE WHEEL MOTOR

BACKGROUND OF THE DISCLOSURE

The present invention relates to rotary fluid pressure devices such as low-speed, high-torque gerotor motors, and more particularly, to an improved spool valve type gerotor motor.

Low-speed, high-torque gerotor motors are typically classified, in regard to their method of valving, as being "spool valve" motors or "disc valve" motors. As used herein, the term "spool valve" refers to a generally cylindrical valve member in which the valving action occurs between the cylindrical outer surface of the spool valve, and the adjacent internal cylindrical surface of the surrounding housing. By way of contrast, the term "disc valve" refers to a valve member which is generally disc-shaped, and the valving action occurs between a transverse surface (perpendicular to the axis of rotation) of the disc valve and an adjacent transverse surface.

Although the present invention may be utilized with gerotor motors of various sizes and various flow and pressure ratings, spool valve motors are typically limited to smaller motors, having relatively lower flow and pressure ratings. This is true partly because of the inherent limitations in a spool valve motor. In a typical spool valve motor of the type to which the present invention relates, the spool valve includes a forward journal surface and a rearward journal surface, each of the journal surfaces cooperating with the adjacent spool bore of the housing to define a clearance. These clearances represent leakage paths which can never be totally eliminated, unlike in the case of disc valve motors.

Furthermore, in most spool valve motors, the spool valve and the motor output shaft are formed integrally. Therefore, in motor applications wherein a side load is applied to the output shaft, the side load typically displaces the valve spool within the housing bore, opening up a larger clearance and leak path between the forward journal surface and the bore. As is well known to those skilled in the hydraulics art, the leakage through a journal fit increases as the cube of the clearance (including around a radially displaced journal), so when a side load displaces the spool within the bore, the leakage through the journal fit increases substantially, thereby reducing volumetric efficiency. Those skilled in the gerotor motor art have recognized the desirability of equalizing the leakages past the forward and rearward journals, to achieve equal volumetric efficiencies for either direction of operation, and better bi-directionality, but prior to the present invention, it has not been possible to provide an arrangement which would result in nearly equal leakages when the motor is subjected to a side load, without decreasing volumetric efficiency.

SUMMARY OF THE INVENTION

It is an object of the present invention to provide an improved spool valve motor which is able to withstand a side load on the output shaft without a substantial decrease in the volumetric efficiency of the motor, while maintaining nearly equal leakages over the front and rear journal, and therefore nearly equal volumetric efficiencies for either direction of operation.

It is a further object of the present invention to provide an improved spool valve motor which is able to achieve the above-stated object, but which also has a better starting torque efficiency under side load than the prior art spool valve motor which merely has two journal bearing surfaces.

The above and other objects of the present invention are accomplished by the provision of a rotary fluid pressure device of the type including housing means having a fluid inlet port and a fluid outlet port and a fluid pressure operated displacement means associated with the housing means and including an internally toothed ring member and an externally toothed star member eccentrically disposed within the ring member for relative orbital and rotational movement therebetween to define expanding and contracting fluid volume chambers in response to the orbital and rotational movements. A spool valve cooperates with the housing means to provide fluid communication between the inlet port and the expanding volume chambers and between the contracting volume chambers in the outlet port.

In accordance with one aspect of the present invention, an output shaft is formed integrally with the spool valve, and included is means for transmitting the rotational movement from the displacement means to the output shaft. The spool valve includes a forward journal surface disposed adjacent the output shaft and cooperating with the housing means to define a nominal forward clearance, and a rearward journal surface disposed toward the displacement means. The output shaft is adapted for a predetermined side load tending to move an outer end of the shaft radially.

The improved rotary fluid pressure device is characterized by the housing means including a bearing receiving portion disposed about the output shaft. A ball bearing set is disposed radially between the output shaft and the bearing receiving portion of the housing means. The ball bearing set is radially preloaded by an amount such that when the output shaft is subjected to the predetermined side load, the shaft has no substantial radial movement within the bearing set.

As greater efforts are being made to apply spool valve type gerotor motors in new applications, it becomes increasingly important to have a spool valve gerotor motor architecture which is axially shorter, smaller overall, and simpler, and therefore less expensive to manufacture.

Accordingly, it is an object of the present invention to provide an improved rotary fluid pressure device which reduces the number of parts in the motor, and therefore, the size, weight and manufacturing cost of the motor.

The above and other objects of the invention are accomplished by the provision of an improved rotary fluid pressure device of the type described previously, and in accordance with another aspect of the invention, there is an input-output shaft means, and means for transmitting the rotational movement from the displacement means to the input-output shaft means. The externally toothed star member has the rotational movement.

The improved device is characterized by the housing means including a valve housing member defining the inlet port and the outlet port, the valve housing member being disposed immediately adjacent the displacement means, and closely spaced apart from the externally toothed star member. The valve spool is disposed immediately adjacent the externally toothed member, and in engagement therewith, when the device is operating under axial load.

DESCRIPTION OF THE PREFERRED EMBODIMENT

Figure 1:
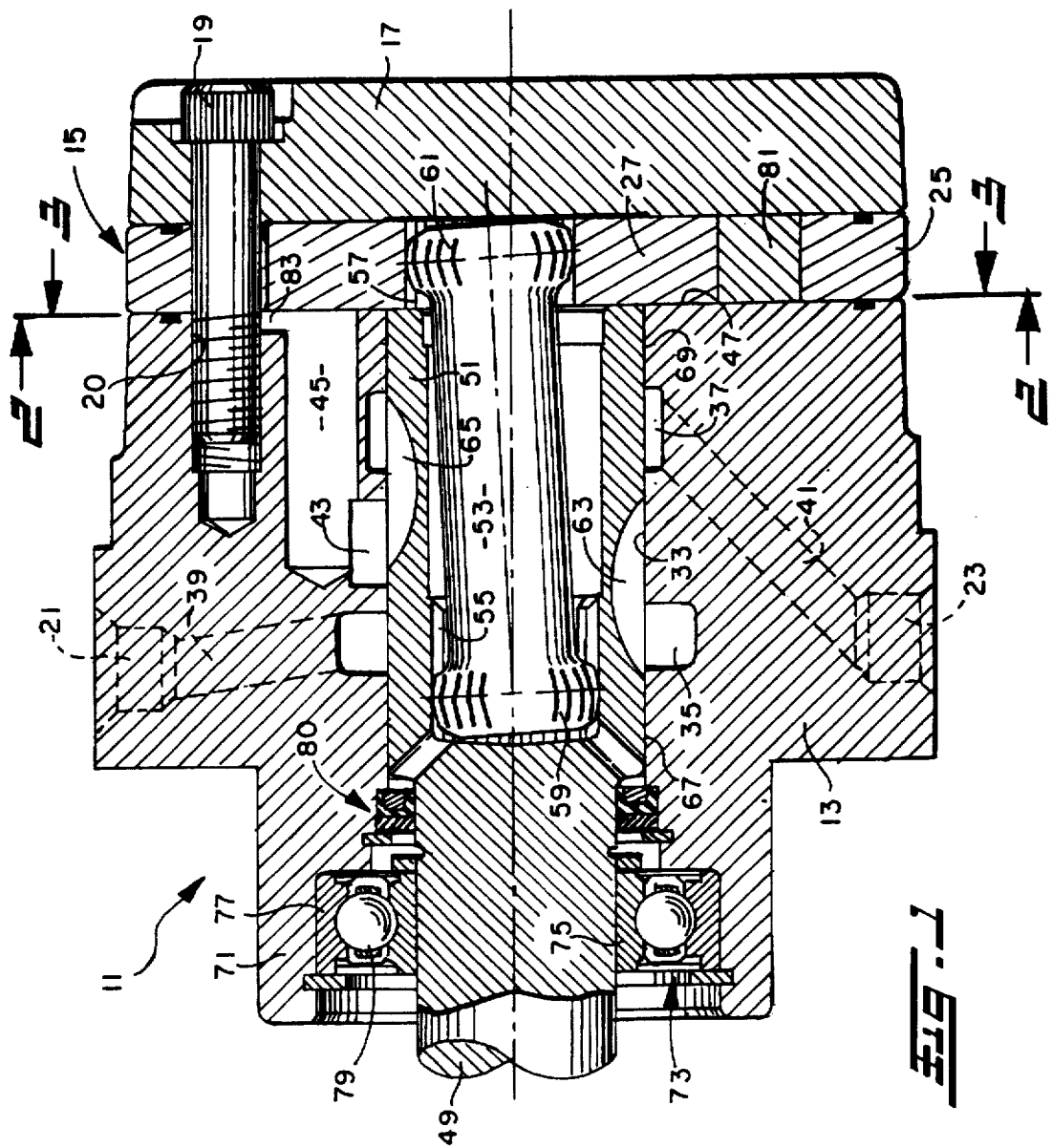
FIG. 1 is an axial cross section of a spool valve type gerotor motor made in accordance with the present invention.

Referring now to the drawings, which are not intended to limit the invention, FIG. 1 is an axial cross section of a fluid motor of the type to which the present invention may be applied. The low-speed, high-torque motor, generally designated 11, is generally cylindrical and comprises several distinct sections. The motor 11 comprises a valve housing 13, a fluid energy-translating displacement mechanism 15 which, in the subject embodiment, is a roller gerotor gear set. Disposed adjacent the gear set 15 is an end cap 17, and the housing section 13, the gear set 15 and the end cap 17 are held together in fluid sealing engagement by a plurality of bolts 19 (only one of which is shown in FIG. 1). Each bolt 19 is received in a generally U-shaped notch 20, defined by the valve housing 13.

The valve housing section 13 includes a fluid port 21 and a fluid port 23. The gerotor gear set 15 includes an internally-toothed ring member 25, through which the bolts 19 pass, and an externally-toothed star member 27. The teeth of the ring 25 and star 27 interengage to define a plurality of expanding fluid volume chambers 29, and a plurality of contracting fluid volume chambers 31 (see FIG. 2), as is well known in the art. Each of the fluid volume chambers 29 and 31 is in open fluid communication with one of the notches 20, through which the bolts 19 pass.

The valve housing 13 defines a spool bore 33, and a pair of annular grooves 35 and 37. The groove 35 is in fluid communication with the fluid port 21 by means of a passage 39, while the annular groove 37 is in fluid communication with the fluid port 23 by means of a passage 41 (shown somewhat schematically in FIG. 1). The valve housing 13 defines a plurality of radial openings 43, each of which opens to the spool bore 33, and each opening 43 is in communication with an axial passage 45, which communicates to a rear surface 47 of the valve housing 13.

Disposed within the spool bore 33 is an output shaft assembly, including a shaft portion 49 and a spool valve portion 51. Disposed within the hollow, cylindrical spool valve 51 is a main drive shaft 53, commonly referred to as a "dogbone" shaft. The output shaft assembly defines a set of straight internal splines 55, and the star 27 defines a set of straight, internal splines 57. The drive shaft 53 includes a set of external crowned splines 59 in engagement with the internal splines 55, and a set of external, crowned splines 61 in engagement with the internal splines 57.

The spool valve 51 defines a plurality of axial passages 63 in communication with the annular groove 35, and a plurality of axial passages 65 in communication with the annular groove 37. The axial passages 63 and 65 are also frequently referred to as "timing slots". As generally well known to those skilled in the art, the timing slots 63 provide fluid communication between the annular groove 35 and the openings 43 disposed on one side of the line of eccentricity of the gerotor gear set 15, while the axial passages 65 provide fluid communication between the annular groove 37 and the openings 43 which are on the other side of the line of eccentricity. The resulting commutating valving action between the axial passages 63 and 65 and the openings 43, as the spool valve 51 rotates, is well known in the art, and will not be described in further detail herein. As is also well known to those skilled in the art, if the fluid port 21 is in communication with a source of pressurized fluid, and the fluid port 23 is in communication with a system reservoir, the output shaft 49 will rotate in one direction (assume clockwise), whereas, if the port 21 is connected to the reservoir and the port 23 is connected to the source of pressure, the output shaft 49 will rotate in the opposite direction (assume counterclockwise).

Although the entire outer cylindrical surface of the spool valve 51 is closely spaced apart from the spool bore 33, there are two distinct regions of the spool valve 51 which are considered as providing the bearing support within the bore 33. The spool valve 51 includes an annular forward journal surface 67 disposed adjacent the output shaft 49, and a rearward journal surface 69, disposed adjacent the rearward end of the spool valve 51. For reasons which are well known to those skilled in the art, it is important to maintain a "bearing fit" or something close to it, between the journal surfaces 67 and 69 and the spool bore 33. It is also very important for good performance of the motor that the radial clearance between the spool valve 51 (between the journal surfaces 67 and 69) and the spool bore 33 be minimized.

As was mentioned in the "BACKGROUND OF THE DISCLOSURE", it is an important feature of the invention to be able to maintain the close fit between the forward journal surface 67 and the bore 33, even when there is a side load applied to the output shaft 49. However, one aspect of the invention is the recognition that it is desirable that the forward journal not carry any of the side load, which could result in seizure at the forward journal. Having the forward journal carrying part of the side load would also result in greater starting pressure under side load. Having the rearward journal carry the load is desirable because the load is smaller in view of its greater distance from the load. The means by which these objectives are accomplished in the present invention will now be described.

The valve housing 13 includes a forward bearing-receiving portion 71 which surrounds part of the output shaft 49. Disposed radially between the output shaft 49 and the bearing receiving portion 71 is a ball bearing set, generally designated 73, including an inner race 75, disposed on the output shaft 49, and an outer race 77, received within the portion 71. Disposed between the races 75 and 77 is a set of ball bearings 79, and the significance of using the ball bearing set 73 (rather than tapered roller bearings or needle bearings) will become apparent subsequently.

In accordance with one aspect of the present invention, the ball bearing set 73 is "preloaded" at the time of assembly between the shaft 49 and the receiving portion 71. By "preloaded" it is meant that either prior to the time of assembly, or during assembly, there is a radial load applied to the ball bearing set 73 which effectively "takes up" initial radial clearance or compensates for any deflection due to subsequent radial loading (side load) which may be applied to the shaft 49. More specifically, the amount of preload is related to the nominal radial clearance between the spool bore 33 and the forward journal surface 67, such that any side load applied to the shaft 49 during normal operation will not substantially change the position of the spool 51 within the bore 33. As a result, there will not be a leakage clearance, any greater than that already existing, which will be opened up because of the side load.

It is believed to be within the ability of those skilled in the art to determine the amount of bearing preload to be applied, in view of the nominal clearance between the bore 33 and the journal surface 67, and further in view of the expected or permitted side load on the shaft 49. For example, if the motor has rated side load capability of 1500 pounds-force, one skilled in the bearing art can select the bearing dimensions, relative to the radial dimension between the shaft 49 and the portion 71, which will provide sufficient interference fit to preload the bearing set 73 sufficiently so that a 1500 pound side load will not cause movement of the shaft 49 within the bearing set 73. This relationship is illustrated in the graph of FIG. 5.

Those skilled in the bearing art will now understand why the present invention requires the use of the ball bearing set 73, instead of tapered roller bearings or needle bearings, neither of which could be preloaded in the manner contemplated in connection with the invention. The use of tapered roller bearings would, as a practical matter, require two sets of bearings, thus making the motor excessive in length, and needle bearings simply cannot be preloaded without damaging the needles. In addition, the use of needle bearings would still require the use of one or more axial thrust bearings to counteract thrust loads on the output shaft-spool valve assembly, thus increasing the length and cost of the motor, whereas the use of the ball bearing set 73 eliminates the need for any additional thrust bearing capability.

Figure 4:
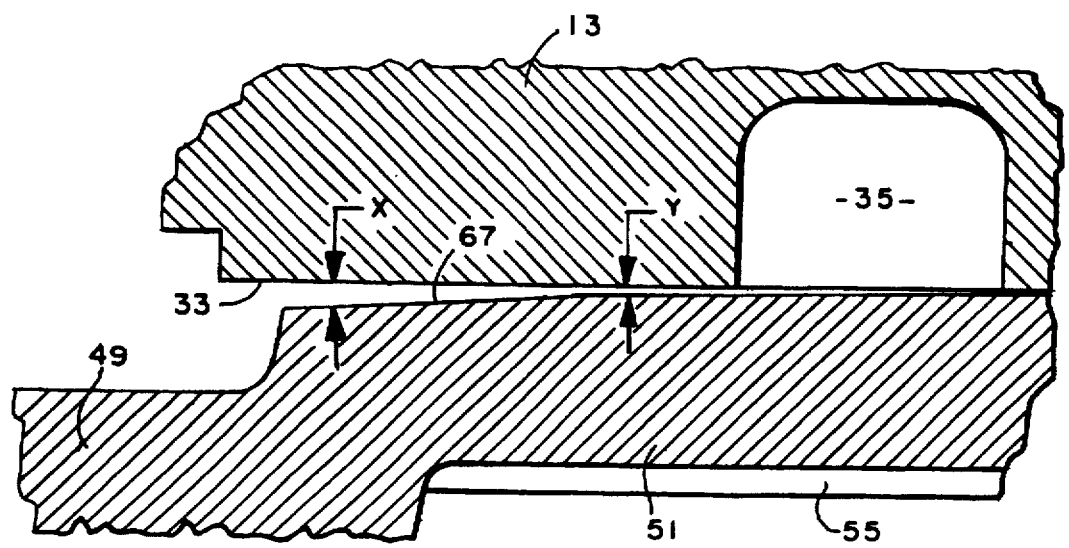
FIG. 4 is an enlarged, fragmentary, axial cross section of the forward journal area, illustrating one aspect of the present invention.
Figure 5:
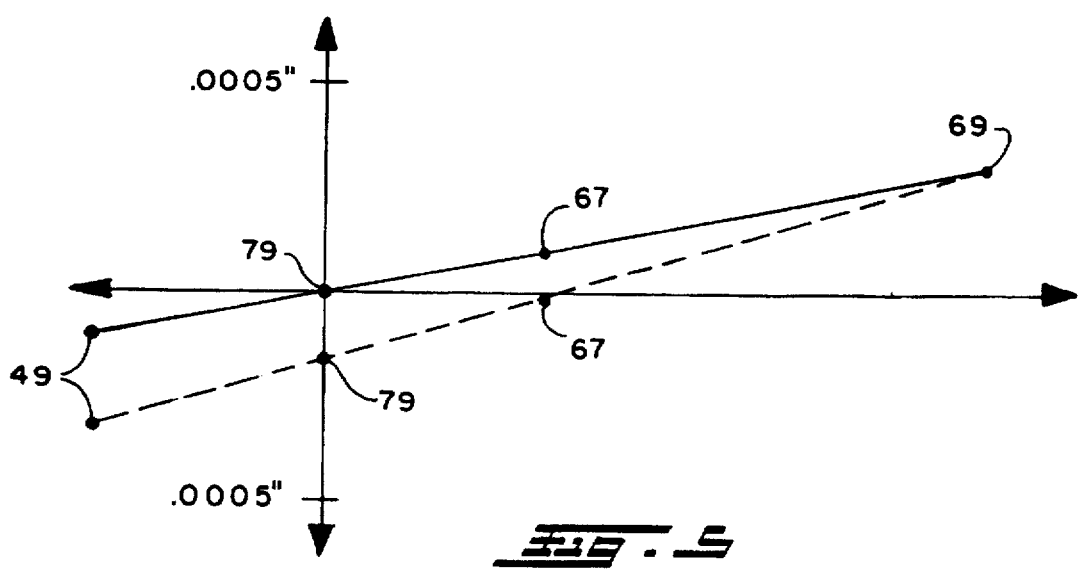
FIG. 5 is a graph of radial deflection versus position along the output shaft-spool valve assembly illustrating another important aspect of the present invention.

Referring now primarily to FIGS. 4 and 5, the implementation and effect of the present invention will be described. In FIG. 4 it may be seen that the forward journal surface 67 is preferably not perfectly cylindrical, but instead, is tapered over at least part of the axial extent of the surface 67. Toward the forward end of the surface 67 it cooperates with the bore 33 to define a radial clearance X which, in the subject embodiment, and by way of example only, is about 0.0009 inches. Toward the rearward end of the surface 67 it cooperates with the bore 33 to define a radial clearance Y which, in the subject embodiment, and by way of example only, is about 0.0003 inches.

In the graph of FIG. 5, the solid line represents the situation wherein the side load on the shaft-spool does not exceed the preload on the bearing set 73, so that when the side load moves the end of the shaft 49 downward in FIG. 5, the shaft-spool pivots about the bearings 79, but the axis of the bearings 79 remains coincident with the axis of the motor (point 79 remains on the ordinate line). At the same time, the rearward journal surface 69 is displaced radially within the bore 33 until all of the radial clearance is taken up, in this case a radial movement of about 0.0003 inches. Thus, the radial movement of the forward journal surface 67 is about 0.0001 inches.

In the subject embodiment of the invention, the ball bearing set 73 is illustrated, by way of example only, as being a "sealed" bearing, thus eliminating the need for a separate dust seal. Another advantage of the invention is that shaft seal life will be increased. The motor includes a shaft seal assembly 80, and because it is positioned axially between the bearing set 73 (which doesn't permit substantial radial movement of the shaft 49) and the journal surface 67, there is minimal radial shaft movement at the seal 80. Therefore, there is less need for the lip of the seal 80 to follow the shaft, resulting in less seal lip wear.

In the graph of FIG. 5, the dashed line represents the situation wherein the side load exceeds the preload on the bearing set 73, so that the side load moves the end of the shaft 49 further downward in FIG. 5, and the axis of the bearings 79 is displaced downward relative to the axis of the motor. The shaft-spool still pivots about the bearings 79 so that the rearward journal surface 69 is again displaced radially until all of the clearance is taken up. In this situation, the forward journal surface 67 is not substantially displaced radially, but the taper on the surface 67 permits the "excessive" side load condition described above, without the journal surface 67 rubbing the bore 33.

It will be understood by those skilled in the art that one result of the invention is that the rearward journal surface 69 still serves as a bearing surface, because it is displaced enough radially to engage the bore 33, whereas the forward journal surface 67 is not displaced radially enough, under rated load, to engage the bore 33. Therefore, unlike prior art spool valve motors, the forward journal surface 67 is really a sealing land rather than a bearing surface.

Referring again to FIG. 5, the dashed and solid lines represent the range of positions for the shaft-spool, when it is subjected to a side load. Therefore, one aspect of the invention is to determine the leakage areas which will exist at the surfaces 67 and 69 under these two conditions, and select the axial dimensions of the surfaces 67 and 69, as well as the radial clearances at each, in order to equalize as nearly as possible the leakages past the journal surfaces 67 and 69. It is believed to be within the ability of those skilled in the gerotor motor art, from a reading and understanding of the present specification, to make the required selections.

Referring again primarily to FIG. 3, another aspect of the present invention will be described. In order to reduce the length, weight and manufacturing cost of the motor 11, but at the same time improve the operating performance, the conventional wear plate disposed between the gerotor gear set 15 and the valve housing 13 has been eliminated. Therefore, references hereinafter, and in the appended claims, to the valve housing 13 or the spool 51 being "immediately adjacent" the ring 25 or the star 27 will be understood to mean that there is no separate wear plate disposed therebetween.

Figure 3:
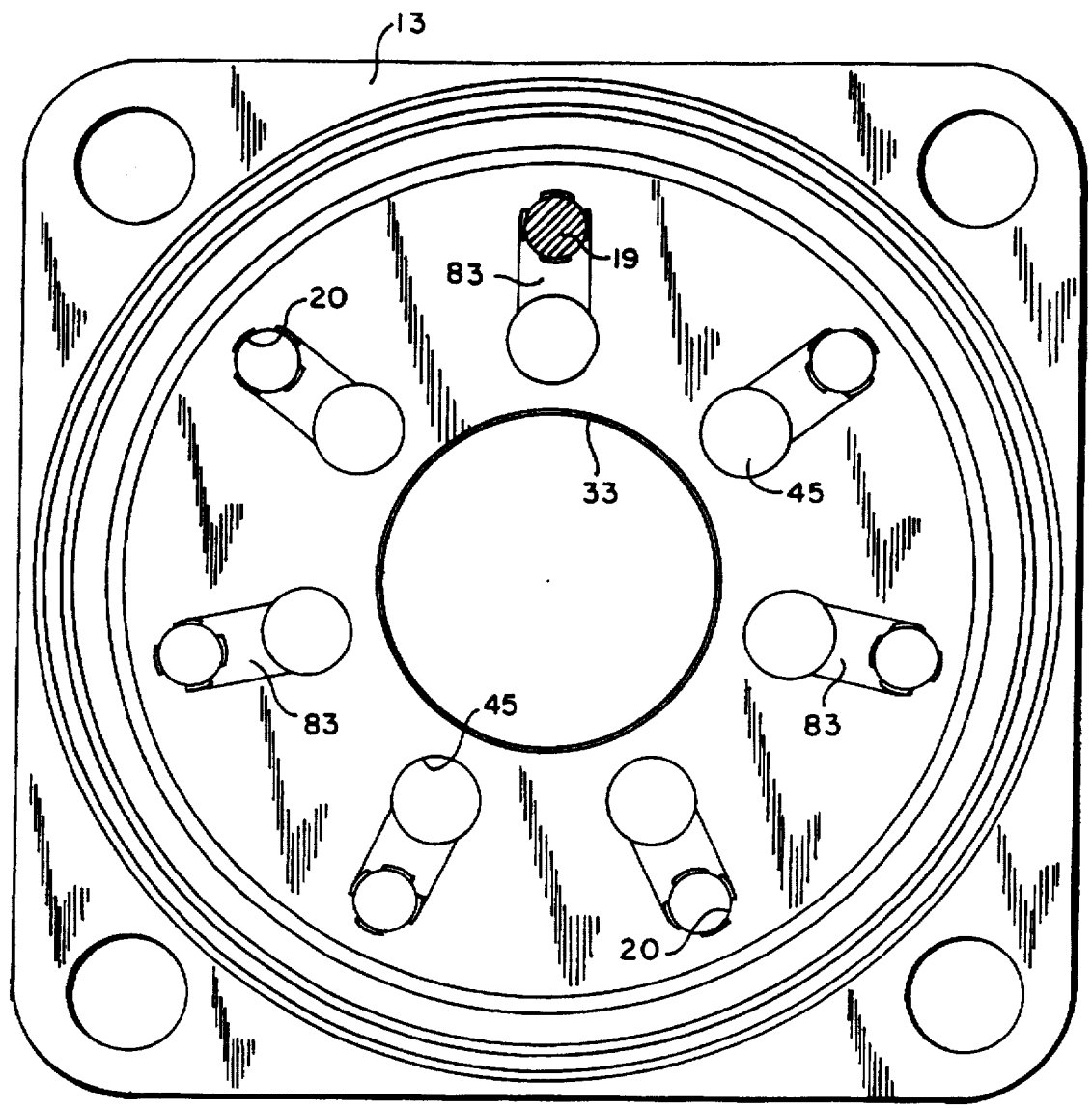
FIG. 3 is a transverse cross section taken on line 3—3 of FIG. 1, and on a slightly larger scale.

It may be seen in FIG. 3 that each bolt 19 and each axial passage 45 are radially aligned, and with each being disposed circumferentially between an adjacent pair of internal teeth or rollers 81. Furthermore, each passage 45 is in open fluid communication with the hole for the respective bolt 19 by means of a recess 83 (see FIGS. 1 and 3), such that, between the passage 45 and the recess 83, there is ample opportunity for fluid communication into the expanding volume chambers 29, and out of the contracting volume chambers 31. It is preferable that the star 27 be relatively large, and have a relatively large eccentricity, thus providing increased area between the star 27 and the rear surface 47, and as a result, a longer leakage path between high pressure and the low pressure case drain (i.e., the interior of the spool valve 51). Another reason for wanting the star 27 to be relatively large is to provide maximum bearing area between the star 27 and the end cap 17, for maximum thrust load carrying capability.

Figure 2:
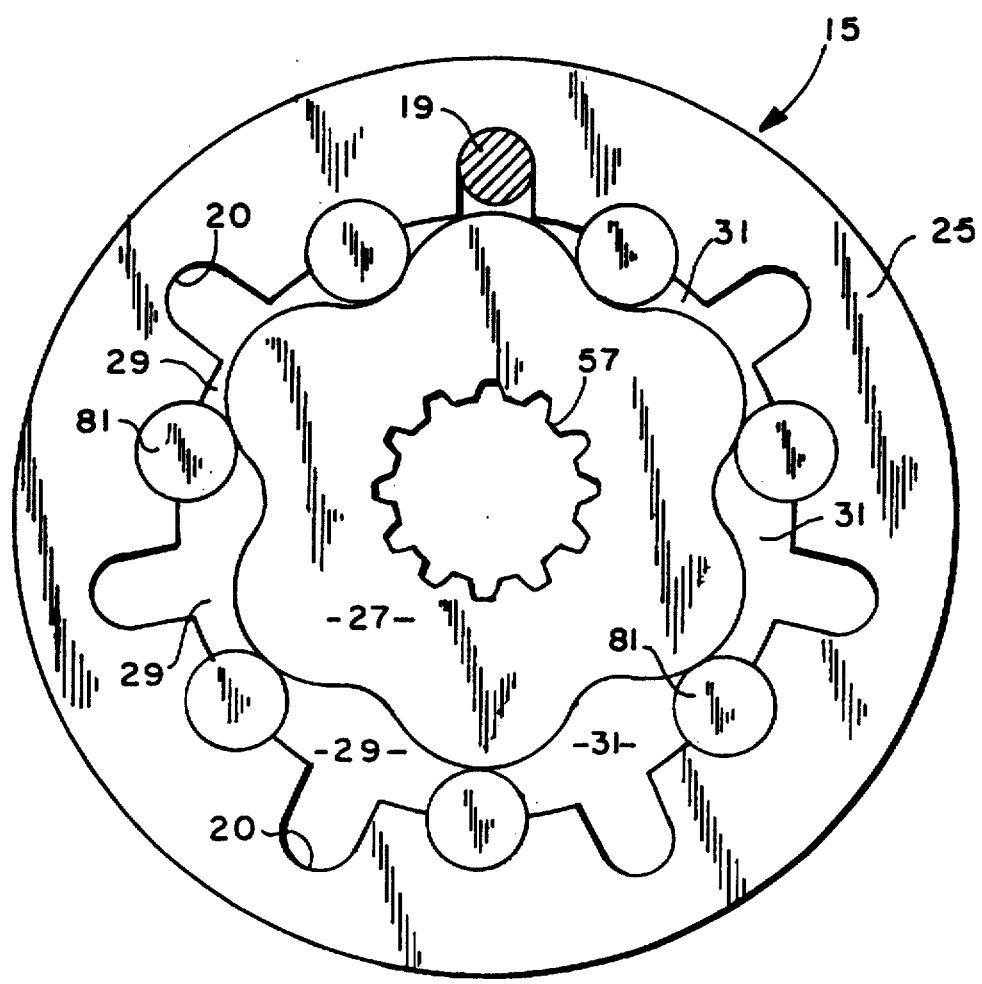
FIG. 2 is a transverse cross section taken on line 2—2 of FIG. 1, and on approximately the same scale.

By comparing FIGS. 2 and 3 it may be seen that one or more of the axial passages 45, on each side of the line of eccentricity, opens against the adjacent surface of the star 27, and because certain of the passages contain high pressure, the star is biased by the high pressure against the adjacent surface of the end cap 17. Therefore, the end cap 17 is preferably hardened, or at least the surface adjacent the star is hardened, so that the end cap is not worn by engagement with the star.

In conventional spool valve gerotor motors, including a wear plate between the gerotor gear set and the valve housing, the rotating spool valve-output shaft assembly is in engagement with the stationary wear plate, thus resulting in a substantial amount of rubbing friction, and a loss of mechanical efficiency. The elimination of the wear plate in the present invention means that the rotating spool valve is in engagement with the orbiting and rotating gerotor star 27, such that the only relative movement which results in rubbing is the orbital movement of the star relative to the spool. Any axial thrust load on the shaft-spool assembly, in the "inward" direction (to the right in FIG. 1) merely results in rubbing engagement of the spool 51 against the star 27.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A rotary fluid pressure device of the type including housing means having a fluid inlet port and a fluid outlet port; fluid pressure-operated displacement means associated with said housing means, and including an internally-toothed ring member, and an externally-toothed star member eccentrically disposed within said ring member for relative orbital and rotational movement therebetween to define expanding and contracting fluid volume chambers in response to said orbital and rotational movements; a spool valve cooperating with said housing means to provide fluid communication between said inlet port and said expanding volume chambers and between said contracting volume chambers and said outlet port; an output shaft formed integrally with said spool valve, and means for transmitting said rotational movement from said displacement means to said output shaft; said spool valve including a forward journal surface disposed adjacent said output shaft and cooperating with said housing means to define a nominal forward clearance, and a rearward journal surface disposed toward said displacement means; said output shaft being adapted for a predetermined side load tending to move an outer end of said shaft radially; characterized by:

(a) said housing means including a bearing-receiving portion disposed about said output shaft;
    (b) a ball bearing set disposed radially between said output shaft and said bearing-receiving portion of said housing means;
    (c) said ball bearing set being radially preloaded by an amount such that when said output shaft is subjected to said predetermined side load, said output shaft has no substantial radial movement within said bearing set; and
    (d) said nominal forward clearance being selected such that, when said output shaft is subjected to said predetermined side load, the radial movement of said forward journal surface within said spool bore is less than said nominal forward clearance, whereby said forward journal surface does not engage said spool bore under said predetermined side load.

2. A rotary fluid pressure device as claimed in claim 1, characterized by said ball bearing set being radially preloaded during assembly between said output shaft and said bearing-receiving portion.

3. A rotary fluid pressure device as claimed in claim 1, characterized by said preload of said bearing set being such that said side load causes said output shaft and said spool valve to pivot about said ball bearing set.

4. A rotary fluid pressure device as claimed in claim 1, characterized by said ball bearing set comprising a sealed bearing set.

5. A rotary fluid pressure device as claimed in claim 1, characterized by a shaft seal assembly being disposed radially between said output shaft and said housing means, and disposed axially between said ball bearing set and said forward journal surface.

6. A rotary fluid pressure device of the type including housing means having a fluid inlet port and a fluid outlet port; fluid pressure-operated displacement means associated with said housing means, and including an internally-toothed ring member, and an externally-toothed star member eccentrically disposed within said ring member for relative orbital and rotational movement therebetween to define expanding and contracting fluid volume chambers in response to said orbital and rotational movements; a spool valve cooperating with said housing means to provide fluid communication between said inlet port and said expanding volume chambers and between said contracting volume chambers and said outlet port; input-output shaft means, and means for transmitting said rotational movement from said displacement means to said input-output shaft means; said externally-toothed star member having said rotational movement; characterized by:

(a) said housing means including a valve housing member defining said inlet port and said outlet port, said valve housing member being disposed immediately adjacent said displacement means, and closely spaced apart from said externally-toothed star member;
    (b) said spool valve being disposed immediately adjacent said externally-toothed member and in engagement therewith, when said device is operating under axial load;
    (c) said valve hosing member defining one fluid passage for each expanding and contracting fluid volume chamber, said valve housing member and said internally-toothed ring member being held in tight, sealing engagement by a plurality N of bolts, said ring member including a plurality N of internal teeth, each of said bolts being disposed circumferentially between an adjacent pair of said internal teeth, and radially aligned with one of said fluid passages; and
    (d) said valve housing member defining a plurality N of notches, each of said notches receiving one of said bolts, and being in fluid communication with one of said expanding and contracting fluid volume chambers, said valve housing member defining, on its surface adjacent said displacement means, one recess providing continuous fluid communication between each fluid passage and its respective notch and fluid volume chamber.

7. A rotary fluid pressure device as claimed in claim 6, characterized by said externally-toothed star member having said orbital and rotational movements, whereby said orbital movement is the only relative movement between said spool valve and said star member.

8. A rotary fluid pressure device as claimed in claim 6, characterized by said valve housing member defining one fluid passage for each expanding and contracting fluid volume chamber, and being in fluid communication therewith, at least some of said fluid passages being covered by said star member as said star member orbits and rotates, said star member being biased away from said valve housing member by fluid pressure in said fluid passages.

* * * * *